US009621554B2

(12) United States Patent
Fong et al.

(10) Patent No.: US 9,621,554 B2
(45) Date of Patent: Apr. 11, 2017

(54) METHOD FOR PROPAGATING ACCESS POLICIES

(75) Inventors: Rodney Fong, Pleasanton, CA (US); Jaya Sreedharan, San Jose, CA (US); Vinayak Kumar, Santa Clara, CA (US)

(73) Assignee: Cisco Technology, Inc., San Jose, CA (US)

(*) Notice: Subject to any disclaimer, the term of this patent is extended or adjusted under 35 U.S.C. 154(b) by 967 days.

(21) Appl. No.: 13/533,478

(22) Filed: Jun. 26, 2012

(65) Prior Publication Data

US 2013/0347059 A1 Dec. 26, 2013

(51) Int. Cl.
*G06F 17/00* (2006.01)
*H04L 29/06* (2006.01)
*H04L 12/28* (2006.01)

(52) U.S. Cl.
CPC .......... *H04L 63/10* (2013.01); *H04L 12/287* (2013.01); *H04L 63/20* (2013.01)

(58) Field of Classification Search
CPC ........ H04L 12/287; H04L 63/10; H04L 63/20
USPC ............................................. 726/1; 713/154
See application file for complete search history.

(56) References Cited

U.S. PATENT DOCUMENTS

| 5,793,307 | A | * | 8/1998 | Perreault et al. ............. 370/451 |
| 6,981,029 | B1 | * | 12/2005 | Menditto et al. ............. 709/217 |
| 8,848,533 | B1 | * | 9/2014 | Stuart ................ H04L 49/3072 370/235 |
| 8,880,487 | B1 | * | 11/2014 | Clinton et al. ................ 707/703 |
| 2002/0126633 | A1 | * | 9/2002 | Mizutani et al. ............. 370/329 |
| 2004/0044771 | A1 | * | 3/2004 | Allred ................... H04L 29/125 709/227 |
| 2004/0181416 | A1 | * | 9/2004 | Lee et al. ......................... 705/1 |
| 2006/0209851 | A1 | * | 9/2006 | Scudder ................ H04L 45/02 370/401 |
| 2007/0083527 | A1 | * | 4/2007 | Wadler ............. G06F 17/30852 |
| 2010/0205251 | A1 | * | 8/2010 | Dutta ...................... G06F 15/16 709/204 |
| 2011/0058545 | A1 | * | 3/2011 | Eriksson ...................... 370/389 |
| 2013/0104251 | A1 | * | 4/2013 | Moore et al. .................. 726/30 |

* cited by examiner

*Primary Examiner* — Tae Kim
*Assistant Examiner* — Peiliang Pan
(74) *Attorney, Agent, or Firm* — Merchant & Gould P.C.

(57) ABSTRACT

The present disclosure describes a network appliance and associated access policy protocol (APP) that communicates and obeys access policies within a network. The network appliance (APP node) propagates access policies to other APP nodes that can utilize the policies most effectively. When an access policy reaches the network boundary, intra network bandwidth is optimized. The access policies may be distributed and executed in the cloud—e.g. proxy firewall, proxy policy execution.

20 Claims, 4 Drawing Sheets

METHOD FOR PROPAGATING ACCESS POLICIES

BACKGROUND

Many home networks employ IP firewalls implemented using PCs running a web-interface based firewall application on a Linux Operating System (OS) or other known approaches. The firewall may lie between the home LAN and the service provider, and the firewall may be configured manually by home network administrators. There is a need to eliminate the firewall appliance in the home network. There also exists a need to simplify the configuration of the firewall, by using the same protocol to communicate access control policy from the home network to existing firewalls.

BRIEF DESCRIPTION OF THE DRAWINGS

The accompanying drawings, which are incorporated in and constitute a part of this disclosure, illustrate various embodiments. In the drawings.

DESCRIPTION OF EXAMPLE EMBODIMENTS

Overview

Figure 1:
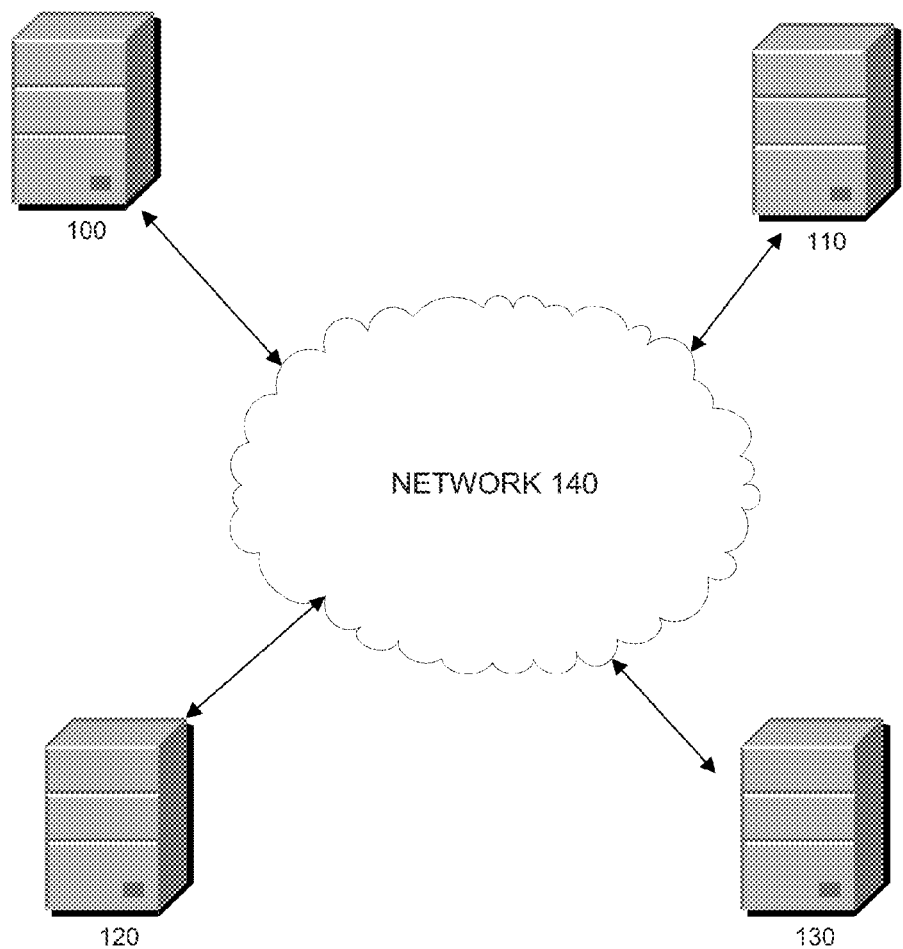
FIG. 1 is a block diagram of an operating environment.

Consistent with embodiments of the present disclosure, systems and methods are disclosed for a protocol that communicates the access control policy from the home network to the service provider. The service provider's edge router may become the proxy firewall for the home network. This may further simplify the configuration of the firewall, by using the same protocol to communicate access control policies from the home network to existing firewalls.

It is to be understood that both the foregoing general description and the following detailed description are examples and explanatory only, and should not be considered to restrict the application's scope, as described and claimed. Further, features and/or variations may be provided in addition to those set forth herein. For example, embodiments of the present disclosure may be directed to various feature combinations and sub-combinations described in the detailed description.

DETAILED DESCRIPTION

The following detailed description refers to the accompanying drawings. Wherever possible, the same reference numbers are used in the drawings and the following description to refer to the same or similar elements. While embodiments of this disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

A (network) access policy protocol (APP) may facilitate the communication of access policy between network nodes—e.g. hosts, firewalls, and routers. The APP may further have the capability to reduce or prune unwanted traffic, as access policies may be propagated along a reverse path toward the traffic's source. Also, the APP may have the capability for network nodes to modify access policies automatically (without user intervention)—e.g. when nodes are congested, or nodes deem themselves under attack.

Figure 2:
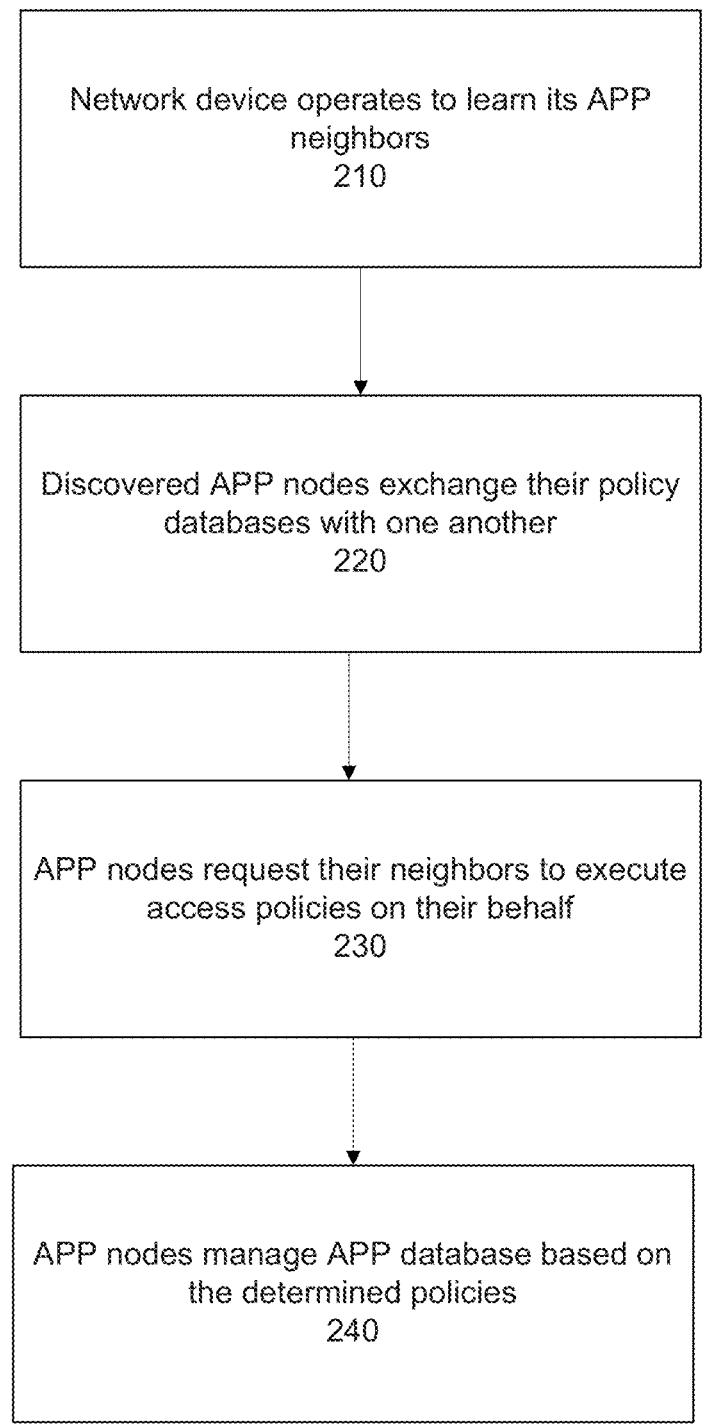
FIG. 2 is a flow chart illustrating embodiments of the present disclosure.

FIG. 1 illustrates an operating environment for embodiments described herein. Embodiments of the present disclosure may include a network device, such as network device 100 and the associated access policy protocol (APP) that communicates and obeys access policies within a network. For example, network device 100 (a.k.a. APP node) propagates access policies to other APP nodes, such as network device 110, network device 120, and network device 130. These other APP nodes may utilize the policies most effectively. In some embodiments, the network devices reside on a network, such as network 140. Network 140 may be a home network, and enterprise network, or any suitable communications network FIG. 2 is a flow chart illustrating embodiments of the present disclosure. Method 200 may begin at step 210 where network device 100 may operate to learn its APP neighbors (in this case, network device 110, network device 120, and network device 130), as described below in further detail in connection with FIG. 3.

Figure 3:
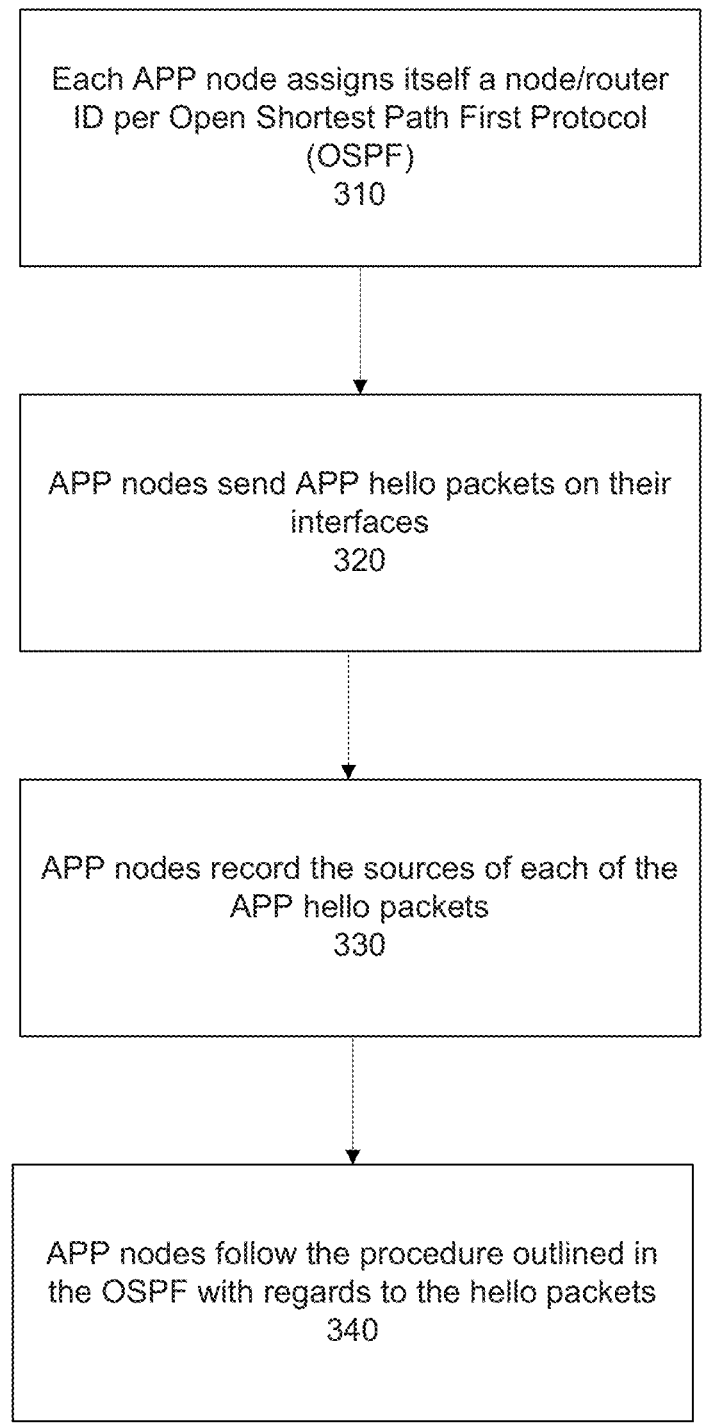
FIG. 3 is a flow chart illustrating embodiments of the present disclosure.

FIG. 3 is a flowchart illustrating embodiments for establishing APP neighbors. Method 300 may begin at step 310 where each APP node may assign itself a node/router ID per Open Shortest Path First Protocol (OSPF). Method 300 may then proceed to step 320. At step 320, the APP nodes may send APP hello packets on their interfaces. The APP hello packets may be detected by the other APP nodes in the system.

Once the APP hello packets are detected, method 300 may proceed to step 330. At step 330, the APP nodes may record the sources of each of the APP hello packets. Finally, at step 340, the APP nodes follow the procedure outlined in OSPF with regards to the hello packets.

Once APP nodes have been discovered, method 200 may proceed to step 220. At step 220, the discovered APP nodes may then exchange their policy databases with one another.

The APP nodes may exchange access policies using APP database packets. In some embodiments, the APP database packets contain lists of access policy advertisements. The access policy advertisements may represent a single access policy—e.g. source IP address range, destination IP address range, IP protocol (e.g. TCP, UDP), TCP and UDP port number range, minimum and maximum data rate (e.g. 0=>deny, all ones=>permit [any rate], non-zero value~>rate-limited access), range of time, and lifetime (in seconds—e.g. 0 means forever). The APP nodes follow the procedure outlined in the OSPF specification to effectuate the database exchange.

The database exchange process may be optimized when an APP node uses the routing table to determine the eligible APP neighbors for policy items from its database. In some embodiments the APP neighbor may be the next-hop router for a policy's source IP address. An APP node may use the routing table to determine the eligible APP neighbors for policy items from its database, where the APP node is the APP neighbor's next-hop router for a policy's destination IP address. An APP node may be further configured to adopt policies that it did not originate as if the APP node was the originator.

Subsequently, at step 230, the APP nodes may request their neighbors to execute access policies on their behalf.

When policy execution (or service) may be requested, the APP nodes send APP request packets to APP neighbors to perform the access policy (on behalf of the requesting node). The APP nodes may next send APP request packets to APP neighbors when a policy is capable of being removed. If an APP neighbor is capable of obeying the access policy, or confirms the removing of a policy, then the neighbor will respond with an APP update packet. Alternatively, if an APP node is no longer capable of obeying an access policy that it is not the originator of, it may send APP request packets to its associated APP neighbor to propagate the policy toward the originating node.

If an APP node receives APP update packets associated with its APP request, then the APP node may move the access policy to its inactive APP database. An APP node may separate its inactive database between policies that it originated and propagated. The APP request and associated update packets will then follow procedures specified in the OSPF protocol.

Embodiments of the present disclosure may include optimizations for the requested policy execution. An APP node may be configured to send an APP request packet (to the source port), if and only if the APP node receives a packet that matches one of its access policies. If an APP node determines that it is congested or under attack, then the APP node may send APP request packets with policies associated with the traffic source(s).

Finally, method 200 may proceed to step 240. At step 240, the APP nodes may proceed to manage the APP database based on the determined policies. Managing the APP database (and access control mechanisms) is achieved through various embodiments of the present disclosure. For example, an APP neighbor may be offline (e.g. because of a lack of APP hello packets or the interface is down). The APP node may then move access control policies associated with offline and unreachable neighbors from its inactive APP database to its active APP database.

In the case where a user changes an access policy—e.g. adding and deleting, changing existing policies, then the APP node may send an APP update packet to notify its neighbors of the change to its APP database. Similarly, whenever there is a change to the APP database, the APP node will update its access control mechanisms accordingly.

APP database optimizations may be managed by embodiments of the present disclosure. For example, An APP node may be configured to create an active entry (on demand) when a packet is received and it matches an inactive access policy.

When embodiments of the present disclosure are implemented, as policies from the APP database propagate throughout the network, access policies will eventually reach the network boundary, and be applied closest to the source. When an access policy reaches the network boundary, intra-network bandwidth will be optimized. The access policies are distributed and executed in the cloud. The initial implementation of the APP protocol would be to have APP as an extension of the OSPF protocol, where OSPF packets contain router Access-Policy-Advertisements that use a reserved Link-State-Advertisement type.

Figure 4:
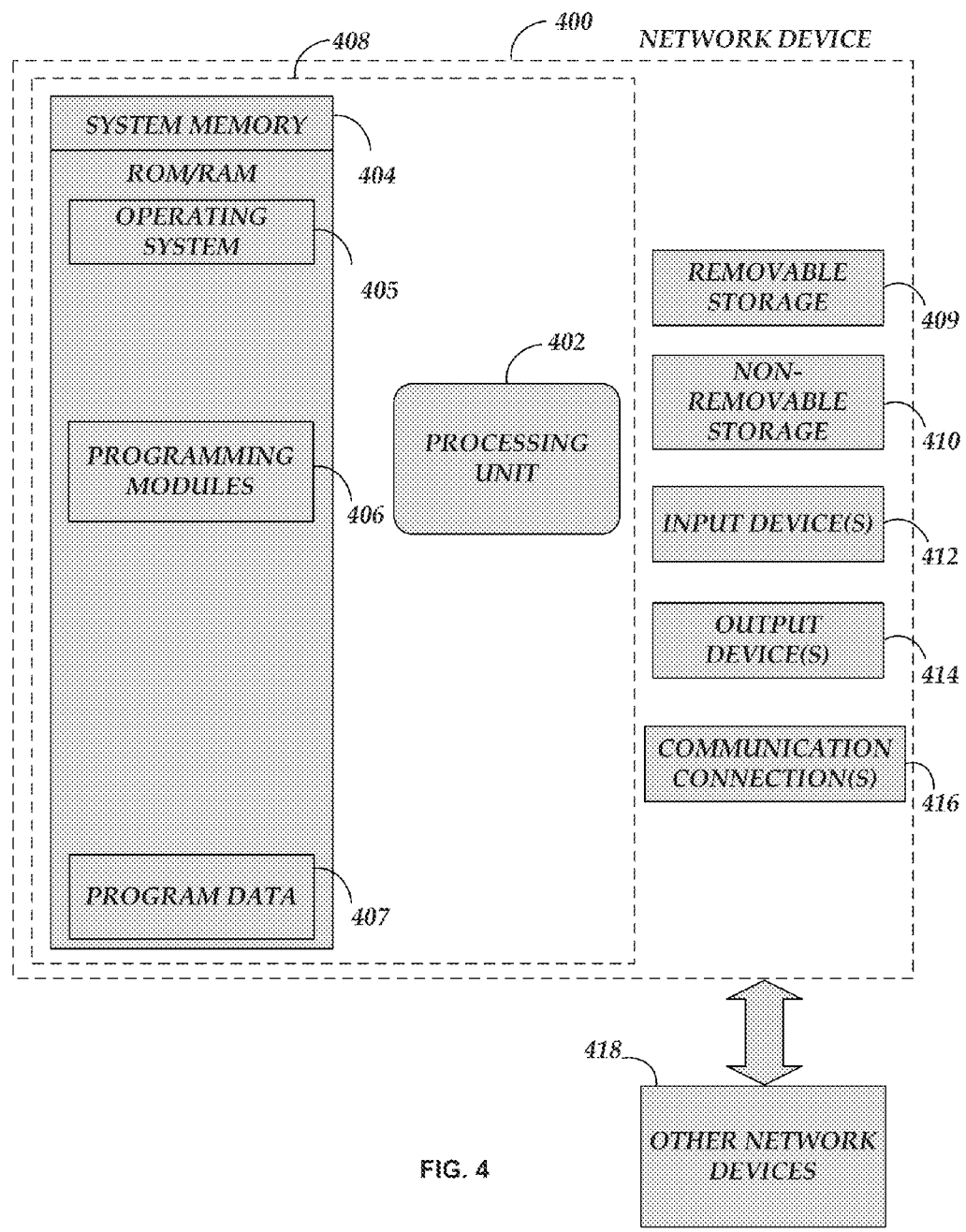
FIG. 4 is a block diagram of a network device.

FIG. 4 is a block diagram of a system including network device 400. Consistent with embodiments of the present disclosure, the aforementioned memory storage and processing unit may be implemented in a network device, such as network device 400 of FIG. 4. Any suitable combination of hardware, software, or firmware may be used to implement the memory storage and processing unit. For example, the memory storage and processing unit may be implemented with network device 400 or any of other network devices 418, in combination with network device 400. The aforementioned system, device, and processors are examples and other systems, devices, and processors may comprise the aforementioned memory storage and processing unit, consistent with embodiments of the present disclosure.

With reference to FIG. 4, a system consistent with embodiments of the present disclosure may include a network device, such as network device 400. In a basic configuration, network device 400 may include at least one processing unit 402, a secure processing unit for decryption 420, and a system memory 404. Depending on the configuration and type of network device, system memory 404 may comprise, but is not limited to, volatile (e.g., random access memory (RAM)), non-volatile (e.g., read-only memory (ROM)), flash memory, or any combination. System memory 404 may include operating system 405, one or more programming modules 406, and may include program data 407. Operating system 405, for example, may be suitable for controlling network device 400's operation. Furthermore, embodiments of the present disclosure may be practiced in conjunction with a graphics library, other operating systems, or any other application program and is not limited to any particular application or system. This basic configuration is illustrated in FIG. 4 by those components within a dashed line 408.

Network device 400 may have additional features or functionality. For example, network device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by network device 400. Any such computer storage media may be part of device 400. Network device 400 may also have input device(s) 412 such as a keyboard, a mouse, a pen, a sound input device, a touch input device, etc. Output device(s) 414 such as a display, speakers, a printer, etc. may also be included. The aforementioned devices are examples and others may be used.

Network device 400 may also contain a communication connection 416 that may allow device 400 to communicate with other network devices 418, such as over a network in a distributed network environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both storage media and communication media.

As stated above, a number of program modules and data files may be stored in system memory 404, including operating system 405. While executing on processing unit 402 or secure processing unit for decryption 420, programming modules 406 may perform processes including, for example, one or more method 200 and 300's stages as described above. The aforementioned process is an example; processing unit 402 and secure processing unit for decryption 420 may perform other processes.

Generally, consistent with per-subscriber stream management according to embodiments of this invention, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments of the present disclosure may also be practiced in distributed network environments where tasks are performed by remote processing devices that are linked through a communications network. In a distributed network environment, program modules may be located in both local and remote memory storage devices.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. Embodiments may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present disclosure, for example, may be implemented as a computer process (method), a network system, or as an article of manufacture, such as a computer program product or computer readable media. The computer program product may be a computer storage media readable by a computer system and encoding a computer program of instructions for executing a computer process. The computer program product may also be a propagated signal on a carrier readable by a network system and encoding a computer program of instructions for executing a computer process. Accordingly, aspects may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present disclosure, for example, are described above with reference to block diagrams and/or operational illustrations of methods, systems, and computer program products according to embodiments of per-subscriber stream management. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the present disclosure have been described, other embodiments may exist. Furthermore, although embodiments have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the present disclosure.

What is claimed is:

1. A method comprising:
    determining a plurality of neighboring network devices;
    exchanging access policy protocol databases between the plurality of neighboring network devices;
    requesting that the plurality of neighboring network devices execute access policies contained in the exchanged access policy protocol databases;
    managing an active access policy protocol database and an inactive access policy protocol database at each of the plurality of neighboring network devices, wherein the active access policy protocol database and the inactive access policy protocol database are separate databases, and wherein the inactive access policy protocol database further separately maintains inactive policies originated by a network device associated with the inactive access policy protocol database and inactive policies propagated by a network device not associated with the inactive access policy protocol database;
    detecting that a neighboring network device is offline; and moving access control policies associated with the offline neighboring network device from the inactive access policy protocol database to the active access policy protocol database.

2. The method of claim 1, wherein determining a plurality of neighboring network devices comprises:
   assigning a node identifier to each of the plurality of neighboring network devices;
   sending access policy protocol hello packets from the plurality of neighboring network devices; and
   recording the sources of received access policy protocol hello packets.

3. The method of claim 1, wherein exchanging access policy protocol databases between the plurality of neighboring network devices comprises: exchanging access policies using access policy protocol packets.

4. The method of claim 3, wherein the access control packets contain lists of access policy advertisements corresponding to access policies.

5. The method of claim 4, further comprising: using a routing table to determine eligible neighboring network devices for policy items from the first access policy protocol database.

6. The method of claim 5, wherein one of the eligible neighboring network devices is a next-hop router for the access policy's source IP address.

7. The method of claim 5, wherein one of the eligible neighboring network devices is a next-hop router for the access policy's destination IP address.

8. The method of claim 5, further comprising: configuring a network device to adopt access policies as if the network device was the originator, regardless of the actual originator.

9. The method of claim 8, wherein the network device is a dedicated server blade.

10. The method of claim 1, wherein requesting that the plurality of neighboring network devices execute access policies contained in the exchanged policy databases comprises:
    sending access policy protocol request packets to the plurality of neighboring network devices requesting the plurality of neighboring network devices to perform the associated access policy on behalf of the requesting network device; and
    receiving access policy protocol update packets confirming compliance with the access policy protocol request packets.

11. The method of claim 10, further comprising: sending an access policy protocol request packet to request removal of an access policy.

12. The method of claim 11, further comprising: moving the access policy to the inactive access policy protocol database.

13. The method of claim 10, wherein if a neighboring network device is no longer capable of obeying an access policy not originated by the neighboring network device, sending access policy protocol request packets to an associated neighboring network device to propagate the access policy to the originating network device.

14. The method of claim 10, further comprising:
    configuring a network device to send an access policy protocol request packet to a source port if the network device receives a packet that matches an existing access policy; and
    if the network device is congested, send the access policy protocol request packet with access policies associated with a congestion source.

15. The method of claim 1, further comprising:
    detecting a user-implemented change to an access policy; and
    sending an access policy protocol update packet to notify the plurality of neighboring network devices of the change.

16. An apparatus comprising:
    a memory; and
    a processor coupled to the memory, wherein the processor is operative to:
        determine a plurality of neighboring network devices;
        exchange access policy protocol databases between the plurality of neighboring network devices;
        request that the plurality of neighboring network devices execute access policies contained in the exchanged access policy protocol databases;
        manage an active access policy protocol database and an inactive access policy protocol database at each of the plurality of neighboring network devices, wherein the active access policy protocol database and the inactive access policy protocol database are separate databases, and wherein the inactive access policy protocol database further separately maintains inactive policies originated by a network device associated with the inactive access policy protocol database and inactive policies propagated by a network device not associated with the inactive access policy protocol database;
        detect that a neighboring network device is offline; and
        move access control policies associated with the offline neighboring network device from the inactive access policy protocol database to the active access policy protocol database.

17. The apparatus of claim 16, wherein the processor being operative to determine the plurality of neighboring network devices comprises the processor being operative to:
    assign a node identifier to each of the plurality of neighboring network devices;
    send access policy protocol hello packets from the plurality of neighboring network devices; and
    record the sources of received access policy protocol hello packets.

18. The apparatus of claim 16, wherein the processor being operative to exchanging access policy protocol databases between the plurality of neighboring network devices comprises the processor being operative to exchange access policies using access policy protocol packets.

19. The apparatus of claim 18, wherein the access control packets contain lists of access policy advertisements corresponding to access policies.

20. The apparatus of claim 19, further comprising the processor being operative to use a routing table to determine eligible neighboring network devices for policy items from the first access policy protocol database.

* * * * *